3,043,798
REACTIONS OF SILICON-NITROGEN CONTAINING COMPOUNDS WITH HYDROXY COMPOUNDS
William M. Boyer, Tinley Park, Ill., and James H. Shultz and Clarence G. Zike, Indianapolis, Ind., assignors to The Richardson Company, Melrose Park, Ill., a corporation of Ohio
No Drawing. Filed Nov. 21, 1958, Ser. No. 775,350
12 Claims. (Cl. 260—46.5)

This invention relates to new resinous compositions derived from the reaction of compositions containing a silicon-nitrogen linkage with organic compositions having a plurality of hydroxyl groups.

As is disclosed in a number of patents to Nicholas D. Cheronis, such as Patent 2,579,418, dated December 18, 1951, a particular class of compositions may be prepared by reacting ammonia or a primary amine with a halosilane. Such a reaction results in replacing the halogen atom attached directly to a silicon atom with an amino group. The halosilanes may be represented, in general, by the generic formula:

$$R_nSiHal_{4-n}$$

wherein "R" is an organic radical, such as an alkyl group, allyl group, aryl group, or the like. "Hal" represents halogen and "$n$" is a number from 0–3. The halogen preferably used is chlorine. The resulting amino compositions are considered to have the following general formulas:

$$R_nSi(NH_2)_{4-n}$$

or $$R_nSi(NHR')_{4-n}$$

depending on whether the halosilane was reacted with ammonia or an amine. However, many of the reaction products tend to undergo an intrapolymerization, as discussed more in detail hereinafter. The foregoing reactions are normally conducted at room temperature or below in the presence of an inert solvent and in the absence of water to prevent hydrolysis.

In many instances, the number of replaceable halogen atoms attached directly to the silicon atom and the number of amino groups substituted for such atoms is referred to in terms of functionality. For example, if the halosilane contains one replaceable halogen atom, such a halosilane would be referred to as monofunctional. The resultant ammonolysis or aminolysis reaction products would also be referred to as monofunctional. Likewise, a halosilane having two or three replaceable halogen atoms would be referred to as being di or trifunctional compounds, respectively, as would their corresponding ammonia or primary amine reaction products.

The ammonolysis or aminolysis of a monofunctional halosilane will give the singular anticipated silicon-nitrogen compound. However, as indicated above, it has been found that the tetrafunctional and may of the di and trifunctional ammonolysis or aminolysis reaction products of the corresponding halosilanes as well as similar products from mixed halosilanes tend to undergo an intrapolymerization at room temperature, forming either liquids or solids, depending on the particular starting materials. In fact, it has been found difficult or impossible to isolate many of the monomers of the higher functional reaction products. It is understood that the intrapolymerization occurs by means of a condensation reaction with the liberation of ammonia. Intrapolymerization reactions involving difunctional products, particularly those containing alkyl groups, tend to form cyclic trimers or tetramers, whereas intrapolymerization reactions involving higher functional silicon-nitrogen compounds tend to form straight or branched chain polymers which, in a number of cases, are believed to consist of a plurality of cyclic rings linked together. When mixtures of halosilanes of different functionality are ammonolyzed or aminolyzed, mixtures of separate polymers or copolymer hybrids may be formed, depending upon the type of halosilanes used.

Certain distinctions may be made with respect to ammonolysis as compared to aminolysis in that in the latter type of a reaction, there is less of a tendency for the reaction products to polymerize to the extent that shorter polymers may be produced. Hence, some degree of control of end products may be obtained by appropriate selection of the initial reactants. Reaction products of ammonia or amines with halosilanes, and particularly the aforementioned polymers, are sometimes referred to as "silamines" or "aminosilanes." The former term will, at times, be used in this specification.

Silamines, in many instances, may be used directly without further modification to form films, coatings, or molded products. In addition, silamines may be modified to obtain additional properties desired in an end product or may be used as modifying agents for other compounds. In the copending application of Shultz et al., Serial No. 670,631, filed July 9, 1957, there has been disclosed and claimed the use of silamines to modify or cure epoxy resins. In the copending application of Boyer et al., Serial No. 771,239, filed November 3, 1958, there has been disclosed and claimed the modification of certain silamines with amines. It has now been discovered that various silamines, when modified with organic compounds containing a plurality of hydroxyl groups in the manner hereinafter disclosed, results in the formation of new resinous compositions having improved properties, particularly for use in forming films and molding compositions. In some instances, materials having excellent lubricating properties have also been obtained. Further, it has also been found that certain silamines may be modified with the aforementioned organic hydroxy compounds to produce intermediate compositions which, in turn, can be further modified to obtain new resinous compositions having improved characteristics.

This invention is directed, primarily, to the modification of tri and difunctional silamines and trifunctional-difunctional silamine blends or hybrid copolymers with organic compounds containing hydroxyl groups, but also includes similar modifications of blends or hybrid copolymers having a degree of tetrafunctionality. Further, it is, in general, contemplated that the hydroxy reactions will involve the polymer-type silamines, however, it is also within the scope of the invention that organic hydroxyl-containing compounds may, likewise, be reacted with silamine monomers where such monomers can be isolated and where the resulting reaction products may form polymers directly or may be converted subsequently to polymers.

As is previously indicated hereinabove, trifunctional silamines are obtained by reacting ammonia or primary amine with a halosilane having three replaceable halogen atoms attached to the silicon atom, the other valence of the silicon atom being taken up by an organic group. The trifunctional ammonolysis or aminolysis reaction products of halosilanes, in many instances, are found to polymerize simultaneously upon formation. These polymerized trifunctional silamines are considered to be represented, generally, by the formula:

$$[RSi(NH)_{1.5}]_x$$

or $$[RSi(NR')_{1.5}]_x$$

In the above formula, "R" represents an organic group attached to the silicon atom of which the following are illustrative: (alkyl)-methyl, ethyl, lauryl, isopropyl, tertiary butyl, cyclopropyl, cyclohexyl, and substituted alkyl groups, such as 2-chloroethyl, beta-trichlorosilylethyl; (aryl)-phenyl, alpha or beta-naphthyl and substituted aryl groups, such as para-chlorophenyl, para-trichlorosilylphenyl; (aralkyl)-phenethyl; and unsaturated groups (alkenyl) vinyl and allyl, (alkynyl) ethynyl. Also contemplated are organic groups, such as (alkylthio) methylthio, ethylthio; (arylthio) phenylthio; and radicals derived from secondary amines, for example, dimethylamino, diethylamino, methylphenylamino. Preferably, "R" is either a monovalent alkyl or aryl group, as such groups have been found, at least at the present time, to have the best stability, especially with respect to hydrolysis.

"R'" is an organic group acquired from a primary amine if the initial reaction involved aminolysis, illustrative amines being alkyl amines, such as methylamine and ethylamine; allylamine; ethylenediamine; hexamethylenediamine; aryl amines, for example, aniline and para-phenylenediamine; and alkaryl amines like benzylamine.

The number "1.5" in the above formulas indicates that each repeating unit of the polymer contains, on the average, one and one-half nitrogen atoms for each silicon atom in the unit and, correspondingly, one organic group attached to the silicon atom. This may be compared to a repeating unit of a polymerized wholly difunctional-type silamine wherein each unit, on the average, contains one nitrogen atom and two analogous organic groups attached to a silicon atom. Tetrafunctional silamines derived from silicon tetrachloride have no organic groups attached to the silicon. Hybrid copolymers will have intermediate ratios of organic groups vs. nitrogen atoms attached to silicon.

To obtain a reaction product of an organic compound containing hydroxyl groups with silamines as contemplated herein, the reactants may be added together directly or in the presence of an inert solvent, such as methylene chloride, benzene or hexane. Many of the silamines, as a result of intrapolymerization, are highly viscous or solid at ordinary temperatures, but may, however, be dissolved in an appropriate solvent of the foregoing type. This is especially true of trifunctional silamines, whereas the difunctional silamines, even in the polymer form, are usually liquid or low-melting solids. Frequently, the silamine itself is retained in solution with the solvent in which it was formed to prevent extensive premature polymerization.

Reaction of silamines with hydroxyl groups involves the liberation of $NH_3$ or a lower primary amine, depending upon the method used initially to form the silamine, and the formation of an Si—O—C bond. From a study of the reaction, it appears to follow the familiar condensation process. If the average functionally of the organic hydroxyl compositions and the silamine is much above two, there is, in some instances, a tendency for the condensation reaction to proceed to the extent that gels, or insoluble solids, may be produced. Accordingly, some degree of care should be exercised in such instances. For example, an excess of the composition containing the lower functionality under the above circumstances will control gelation and permit the reaction to proceed at a predeterminable rate to a point where the viscosity or final cure can be controlled.

Various end products having a wide variety of properties may be obtained by appropriate selection of the silamine and organic hydroxy compound. Such products may extend from oils, which are suitable as lubricants, up to hard, dense, highly cross-linked resins adaptable for use in molding compositions. Silamines having low functionally are generally more suitable for reaction with hydroxyl compounds to produce oils or liquid compositions, whereas silamines containing an appreciable degree of tri or tetrafunctionality will result in cured resinous materials appropriate for molding when reacted with the hydroxy compounds. Intermediate compositions having characteristics of both extremities may also be made when a particular application dictates such a composition. Numerous exemplary methods of obtaining distinguishing properties may be cited. Thus, the halosilanes from which the silamines are made may be varied, as for example, by using halosilanes which are both difunctional but which have different organic groups, such as dimethyldichlorosilane and diphenyldichlorosilane, or which are of mixed functionally, such as dimethyldichlorosilane and methyltrichlorosilane.

In general, the reaction of an organic hydroxy compound with a silamine will proceed in the expected manner at room temperature or slightly above. However, in some instances, it will be found that certain reactions will not take place at the usual temperatures and when subjected to heat, undergo an exotherm reaction quickly forming a gel which is unuseable for any purpose. It has been found that many of the reactions which present problems of this type may be initiated at or near room temperatures and otherwise controlled if conducted in the presence of an acid catalyst For some particular purpose, it may be necessary to react an organic compound containing not only an hydroxy group, but also other reactive groups, such as an amine, or acid group. The hydroxy group is more reactive than most other groups of the type indicated, at least at room or moderately elevated temperatures and, hence, a desired reaction involving the hydroxy group can be expected to take place to the exclusion of other reactive groups.

While it is possible to react an organic compound containing one hydroxyl group with, for example, a trifuntional silamine or a mixture of tri and difunctional silamines, such a reaction, except for very specialized applications, has limited utility. The present invention, as previously indicated, is primarily concerned with those reactions involving polymerizable or polymerized silamines and polyhydroxy organic compounds, wherein the OH group is attached to carbon. Compounds of the latter type serve as cross-linking agents for the silamines enabling the formation of improved resinous compositions.

Both aliphatic and aromatic type organic hydroxyl containing compounds are contemplated and in particular compounds wherein the hydroxyl groups are attached to separate carbon. Illustrative compounds are: ethylene glycol, propylene glycol, Bisphenol-A, ethyl cellulose, pentaerythritol, 1,5 pentanediol, 2-butene-1,4-diol, hydroquinone, and polyvinyl alcohol. Also within the scope of the invention, as reactants with silamines, are compositions which may be considered hydroxyl-containing polymers, such as polyesters having free hydroxyl groups. Aromatic hydroxyl-containing compounds on the whole will yield more heat-stable products than corresponding aliphatic compounds and also tend to be more reactive with silamines, probably due to their higher natural acidity.

As further illustrating the invention, but without intending to thereby limit the same, the following examples are presented.

*Example 1*

242 grams of a silamine, prepared by reacting excess liquid ammonia with diphenyldichlorosilane in methylene chloride, were mixed with 12.4 grams (0.2 mole) of ethylene glycol in methylene chloride solution in a resin reaction flask and refluxed for twenty minutes with the evolution of considerable quantities of ammonia. The temperature was then raised by allowing the solvent to distill out until the first signs of insoluble material appeared. The reaction mixture was then cooled and xylene was added in a sufficient quantity to redissolve the mixture completely. The xylene solution was filtered through charcoal to remove color. Films cast on microscope slides allowed to air dry and baked for fifteen minutes at 120° C. were hard, abrasion-resistant, somewhat brittle, somewhat adherent and were insoluble in methylene chloride.

*Example II*

Fifty grams (0.57 mole) of 2-butene-1,4-diol were placed in a resin reaction flask and heated to 75° C., at which point 295 grams (1.37 moles) of the silamine of Example I (2 moles of silamine per mole of the butenediol) were added in a period of two hours. The mixture was subsequently heated to 120° C. and yielded a viscous orange resin.

*Example III*

333 grams of pure solid silamine of Example I and 36 grams of hydroquinone were mixed with 40 grams of toluene heated to 300° C. over two hours yielding a hard, brittle, soluble, fusible resin.

*Example IV*

65 grams (0.285 mole) of Bisphenol-A and 20 grams of toluene were heated to 220° C. where the toluene refluxed and 200 grams (solids) of silamine of Example I (0.934 mole as diphenyldiaminosilane) were added over forty-five minutes. The temperature was held at 220° C. for one hour while ammonia was evolved. The resin was a viscous semi-solid. After heating for six hours at 150° C., the resin was a solid at room temperature.

*Example V*

A mixture of 15 grams of diethylene glycol and 10 grams of hexamethylcyclotrisilazane were refluxed for four hours at 225° F. Considerable ammonia was evolved. The product had a refractive index at 20° C. of 1.4488. When the product was reheated in open air at 550° F. for one-half hour, the refractive index was unchanged. This refractive index is higher than that of either of the starting materials. This product was an excellent lubricant at low temperatures. Its viscosity at room temperature was approximately 200 centipoises and at minus 10° C. was approximately twice that. The exposure of this product to room temperature air for twenty-four hours in a thin film resulted in a lowering of the refractive index to only 1.4482.

*Example VI*

100 grams of the silamine of Example I and 10 grams of a silamine, prepared by ammonolyzing a mixture of equal mole quantities of methyltrichlorosilane and dimethyldichlorosilane were added slowly to a refluxing mixture of 30 grams of 1,4-butenediol and 50 grams of toluene. The mixture was heated to 220° C., distilling out the solvent, and yielding a light, very viscous, difficultly soluble resin. Six months later, the resin had become completely solid.

*Example VII*

100 grams of ethylcellulose, grade N7, 400 grams of methylene chloride and 75 grams of a silamine, prepared by ammonolyzing equal mole quantities of dimethyldichlorosilane and phenyltrichlorosilane, in methylene chloride solution containing 12.9 percent solids, were thoroughly mixed. During the mixing, the viscosity of the solution rose rapidly and ammonia was evolved. A film was spread on a glass plate. The film hardened and would not melt at 375° C. The solution, after standing over the week-end, formed a firm gel containing methylene chloride. The gel is swellable in methylene chloride but would not redissolve in it.

*Example VIII*

Phenyltrichlorosilane, in methylene chloride solution, was ammonolyzed with excess liquid ammonia. Eighteen parts by weight of the silamine in methylene chloride were mixed with 33 parts by weight of Bisphenol-A in tetrahydrofuran, the solvents being stripped on a hot plate until the mixture became a syrup. To this mixture was added 49 parts by weight of one-half inch glass fiber. The resulting composition, after thorough mixing and removal of excess solvent, was molded in a 1″ x ⅛″ x 6″ mold at twelve tons total pressure for twenty minutes at 160° C. The molded bar was found to have the following properties:

Heat distortion temperature _____ Over 400° C.
Flexural strength _____ 9000 p.s.i.

*Example IX*

A methylene chloride solution of 31 parts by weight of a silamine, prepared by reacting excess liquid ammonia with methyltrichlorosilane in a methylene chloride solution, were mixed with 19 parts by weight of propylene glycol. After mixing, the methylene chloride was removed and the composition molded in the same mold as used in Example VIII under twelve tons total pressure at 160° C. for five minutes. The resulting molded bar was found to have the following properties:

Heat distortion temperature _____ 420° C.
Flexural strength _____ 8000 p.s.i.

*Example X*

Fifty-two parts by weight of the silamine of Example VIII in methylene chloride were mixed with 48 parts by weight of diethylene glycol in tetrahydrofuran. The resulting solution was used to impregnate a plurality of 181–112 glass mats. After drying the impregnated mats in a 130° oven for two and one-half hours, a plurality of the mats were superimposed and inserted between the platens of a press where they were subjected to a pressure of 1200 p.s.i. for one hour at a temperature of 165° C. The resulting laminate, one-sixteenth of an inch thick, was determined to have the following properties:

Flexural strength _____ 25,000 p.s.i.
Arc resistance _____ Over 180 seconds.
80° F. power factor _____ .0224.
80° F. dielectric constant _____ 4.3.

Heat distortion and flexural strength properties were determined in accordance with the procedures specified in ASTM test No. D648–45T and D790–49T, respectively. The other properties of the laminate of Example V were, likewise, determined by standard ASTM procedures.

The present invention enables the formation of new resinous materials adaptable for use in molding compositions under heat and pressure and also production of protective films or coatings. Properties may be varied considerably depending upon the end use, but in general, the new resins can be said to have high heat resistance and durability when cured. In those instances wherein oils are produced in lieu of curable resins, the oils have been found to have excellent properties and resistance to deterioration through oxidation.

Having disclosed the invention and certain exemplary embodiments thereof, the same is intended to be limited only by the scope of the following claims.

We claim:

1. The process of preparing a resinous composition of matter by reacting (a) the polymeric reaction product of a halosilane having the formula:

$$RSiCl_3$$

wherein "R" is selected from the class consisting of monovalent alkyl and aryl groups, with ammonia; and (b) an organic compound from the class consisting of aliphatic and aromatic polyhydroxyl compounds having at least two hydroxyl groups attached to separate carbon atoms, the principal reaction occurring between the amino groups of said polymeric reaction product and the hydroxyl groups of said organic compound.

2. The process of claim 1 wherein "R" is selected from the class consisting of methyl and phenyl radicals.

3. The process of preparing a resinous composition of matter by reacting (a) the polymeric reaction product of a mixture of halosilanes having the formula:

$$RSiCl_3$$
and
$$R_2SiCl_2$$

wherein "R" is selected from the class consisting of monovalent alkyl and aryl groups, with ammonia; and (b) an organic compound from the class consisting of aliphatic and aromatic polyhydroxyl compounds having at least two hydroxyl groups attached to separate carbon atoms, the principal reaction occurring between the amino groups of said polymeric reaction product and the hydroxyl groups of said organic compound.

4. The process of claim 3 wherein "R" is selected from the class consisting of methyl and phenyl radicals.

5. The process of preparing a resinous composition of matter by reacting (a) the polymeric reaction product of a mixture of halosilanes having the formula:

$$RSiCl_3$$
$$R_2SiCl_2$$
and
$$SiCl_4$$

wherein "R" is selected from the class consisting of monovalent alkyl and aryl groups, with ammonia; and (b) an organic compound from the class consisting of aliphatic and aromatic polyhydroxyl compounds having at least two hydroxyl groups attached to separate carbon atoms, the principal reaction occurring between the amino groups of said polymeric reaction product and the hydroxyl groups of said organic compound.

6. A composition of matter produced by the process of claim 1.

7. A composition of matter produced by the process of claim 3.

8. A composition of matter produced by the process of claim 5.

9. The process for preparing a resinous composition of matter by reacting: (a) the polymeric reaction product of phenyltrichlorosilane and ammonia with (b) an organic compound from the class consisting of aliphatic and aromatic dihydroxyl compounds wherein the two hydroxyl groups are attached to separate carbon atoms, the principal reaction occurring between the amino groups of said polymeric reaction product and the hydroxyl groups of said organic compound.

10. The process of claim 9 wherein the organic compound is a bisphenol.

11. The process of claim 9 wherein the organic compound is diethylene glycol.

12. A synthetic laminate formed by subjecting an assembly comprising a plurality of superimposed glass fiber sheets impregnated with the composition of claim 11 to heat and pressure whereby the assembly is consolidated into an integral board-like product.

References Cited in the file of this patent

UNITED STATES PATENTS

| | | |
|---|---|---|
| 2,566,363 | Pedlow et al. | Sept. 4, 1951 |
| 2,579,418 | Cheronis | Dec. 18, 1951 |
| 2,676,163 | Speier | Apr. 20, 1954 |
| 2,876,209 | De Benneville et al. | Mar. 3, 1959 |
| 2,885,370 | Groszos et al. | May 5, 1959 |

OTHER REFERENCES

Miner et al.: Ind. Eng. Chem., vol. 39, pages 1368–71 (1947).

Rochow: An Introduction to the Chemistry of the Silicones (2nd ed.), 1951, pp. 58 and 59, publ. by John Wiley & Sons, N.Y.